(12) United States Patent
Chou

(10) Patent No.: US 7,182,578 B2
(45) Date of Patent: Feb. 27, 2007

(54) CERAMIC SPINDLE COUPLING STRUCTURE

(75) Inventor: Chin-Wen Chou, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 0 days.

(21) Appl. No.: 10/792,827

(22) Filed: Mar. 5, 2004

(65) Prior Publication Data

US 2005/0196226 A1    Sep. 8, 2005

(51) Int. Cl.
    *B64C 11/04*    (2006.01)
(52) U.S. Cl. .............................. 416/204 R; 416/213 A; 416/244 R; 464/42; 403/192; 403/193; 403/243; 403/367; 403/368
(58) Field of Classification Search ........ 403/192–194, 403/197, 243, 367, 368; 416/204 R, 213 A, 416/244 R; 464/42
    See application file for complete search history.

(56) References Cited

U.S. PATENT DOCUMENTS

| 4,643,648 A | * | 2/1987 | Huller .................... 416/241 B |
| 4,915,589 A | * | 4/1990 | Gessler et al. .......... 416/241 B |
| 4,984,927 A | * | 1/1991 | Kojima et al. ................ 403/30 |
| 6,017,190 A | * | 1/2000 | Lackey ................... 416/244 R |

FOREIGN PATENT DOCUMENTS

TW            517784        1/2003

* cited by examiner

*Primary Examiner*—Daniel P. Stodola
*Assistant Examiner*—Michael P. Ferguson
(74) *Attorney, Agent, or Firm*—Birch, Stewart, Kolasch & Birch, LLP

(57) ABSTRACT

A ceramic spindle coupling structure includes a metal bushing which has a housing space that has an inlet and a tapered fastening section of a smaller diameter than the inlet to form a tight coupling with a ceramic spindle without embossing the ceramic spindle and the metal bushing.

9 Claims, 3 Drawing Sheets

CERAMIC SPINDLE COUPLING STRUCTURE

FIELD OF THE INVENTION

The present invention relates to a ceramic spindle coupling structure and particularly to a structure for coupling a ceramic spindle with air fan vanes through a metal bushing.

BACKGROUND OF THE INVENTION

The conventional air fans used on high speed processors such as microprocessors that include metal spindles encounter many problems such as the airflow is not sufficient to disperse the growing amount of heat being generated, rotation speed is not fast enough, etc. Increasing the speed and airflow volume will result in shorter service life of the metal spindle. Therefore ceramic spindle has gradually replaced the metal spindle these days. The ceramic material is very hard and rigid, and can withstand wearing and high temperature. Thus the air fan rotation speed may increase to disperse heat as desired.

However, test process during fabrication shows that there are still problems in the design of the ceramic spindle remained to be resolved. For instance, the ceramic spindle is usually jointly formed with the fan by injection. The ceramic spindle generally has a smooth surface and a low friction coefficient, hence the centrifugal force occurred at high speed rotation of the fan tend to result in separation of the ceramic spindle from the air fan and incurs skid. To remedy this problem, one of the approaches is to increase the friction of the surface of the ceramic spindle so that it can be coupled with the air fan tightly during injection forming. The original purpose of using the ceramic spindle is to take the advantage of its greater hardness and rigidity. The embossing process is useless for the ceramic spindle since the ceramic spindle is very hard and rigid. Even if the embossing process is finally done and successfully created a rough surface to the ceramic spindle, it would be a very time and cost consuming which is not economical.

To solve the aforesaid problem, Applicant has disclosed a patent in ROC patent publication No. 517784 entitled "Ceramic spindle coupling structure for air fans". In that patent, the ceramic spindle has one end coupled with a metal bushing having a greater friction coefficient. Referring to FIG. 2 of the above patent for an embodiment, the inner ring surface of the metal bushing is embossed by a machine to increase the friction coefficient. The outer surface of the metal bushing is embossed to increase the friction coefficient. Then the metal bushing is tightly coupled with the ceramic spindle. The metal bushing is coupled with the air fan by injection forming to become integrated. Hence the ceramic spindle may be tightly coupled with the air fan without breaking loose. Such a structure requires embossing on the inner ring surface and outer surface of the metal bushing by machining. It needs additional embossing operations for the metal bushing during fabrication process. Production cost is higher. There is still room for improvement.

SUMMARY OF THE INVENTION

Therefore the primary object of the invention is to provide a simpler ceramic spindle coupling structure. A metal bushing with a tapered housing space is provided to form a tight coupling with a ceramic spindle so that embossing of the inner wall and outer surface of the metal bushing to increase the friction force is not necessary. Thereby cost may be reduced.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
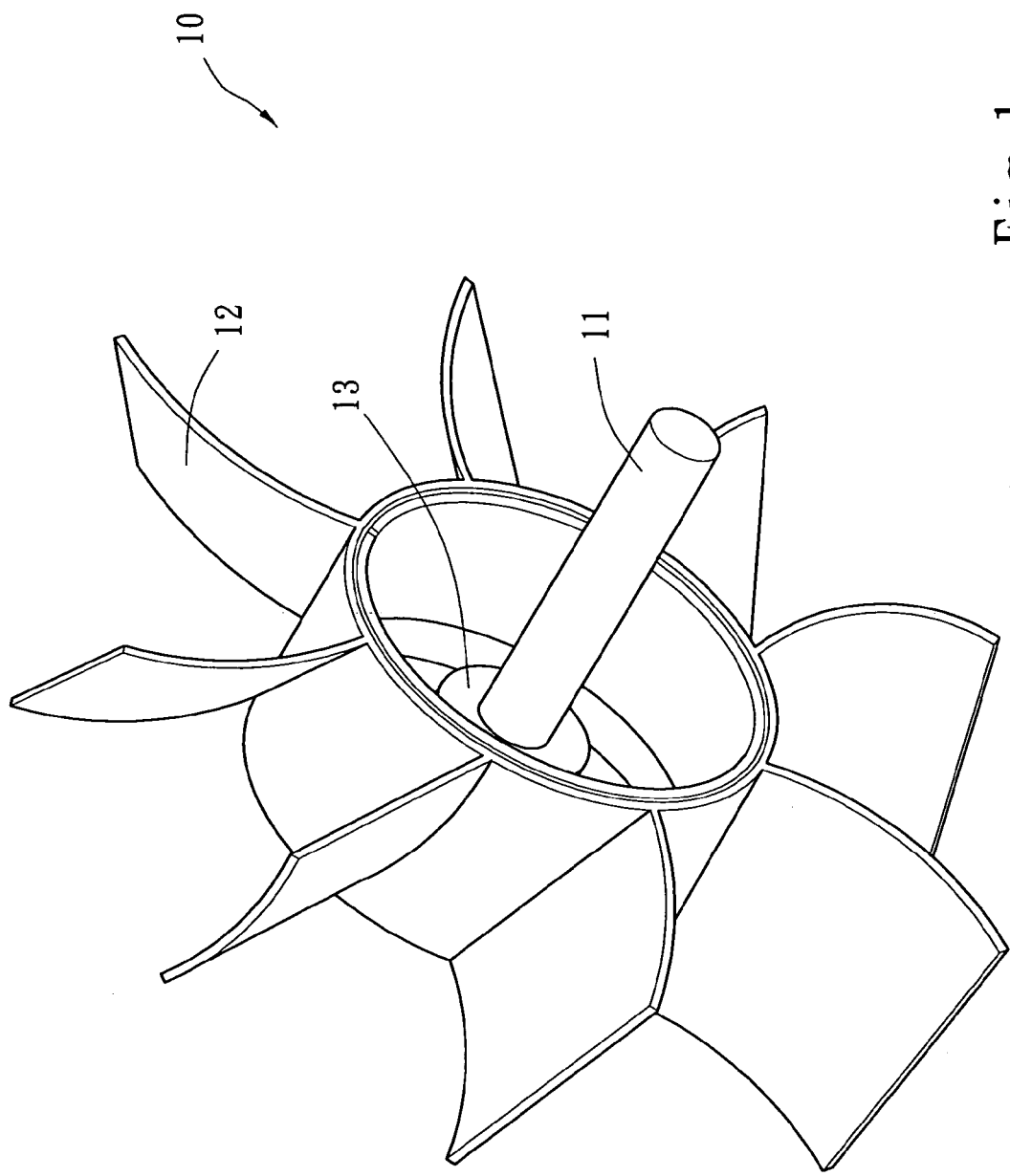
FIG. 1 is a perspective view of the present invention in a use condition.
Figure 2:
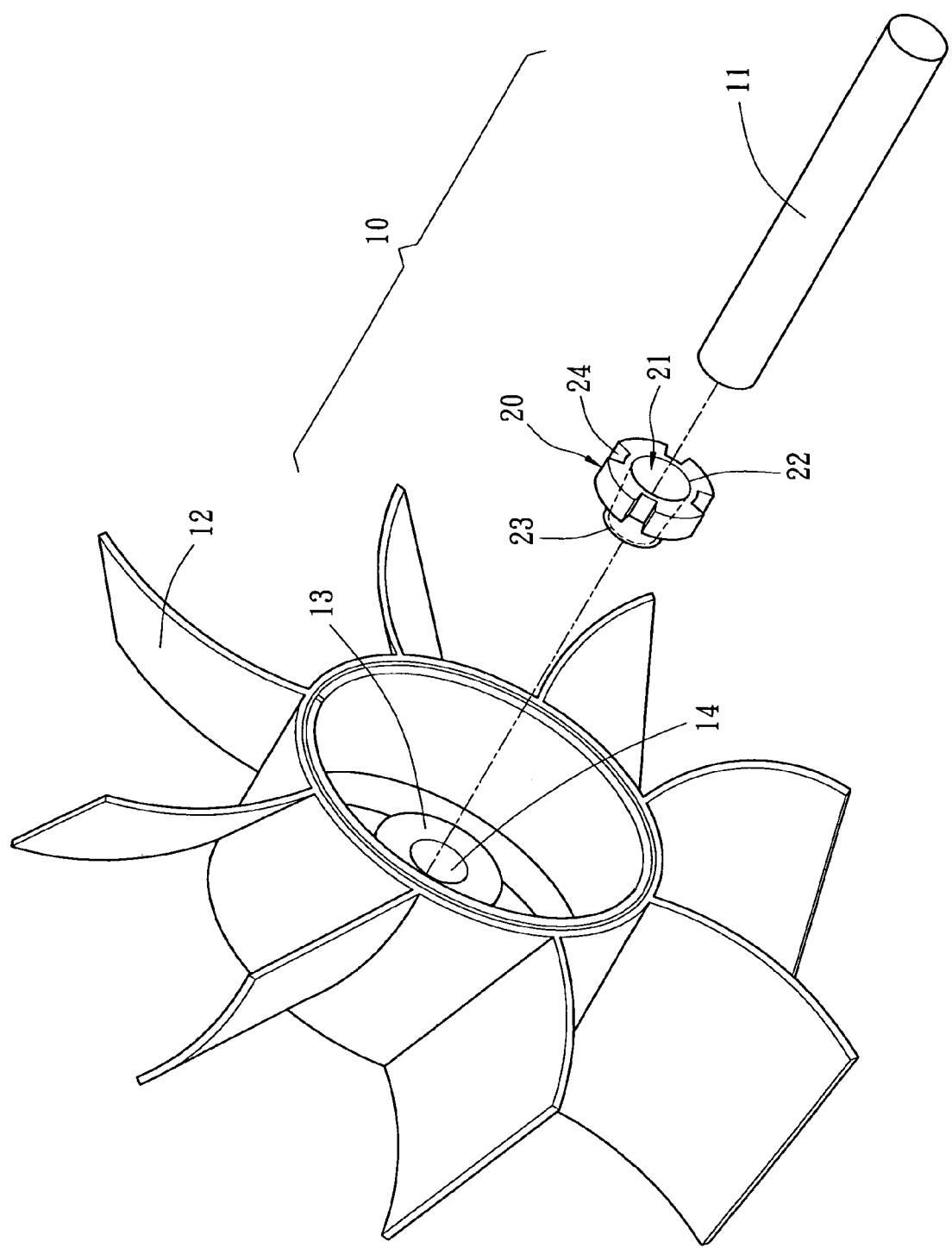
FIG. 2 is an exploded view of the invention.
Figure 3:
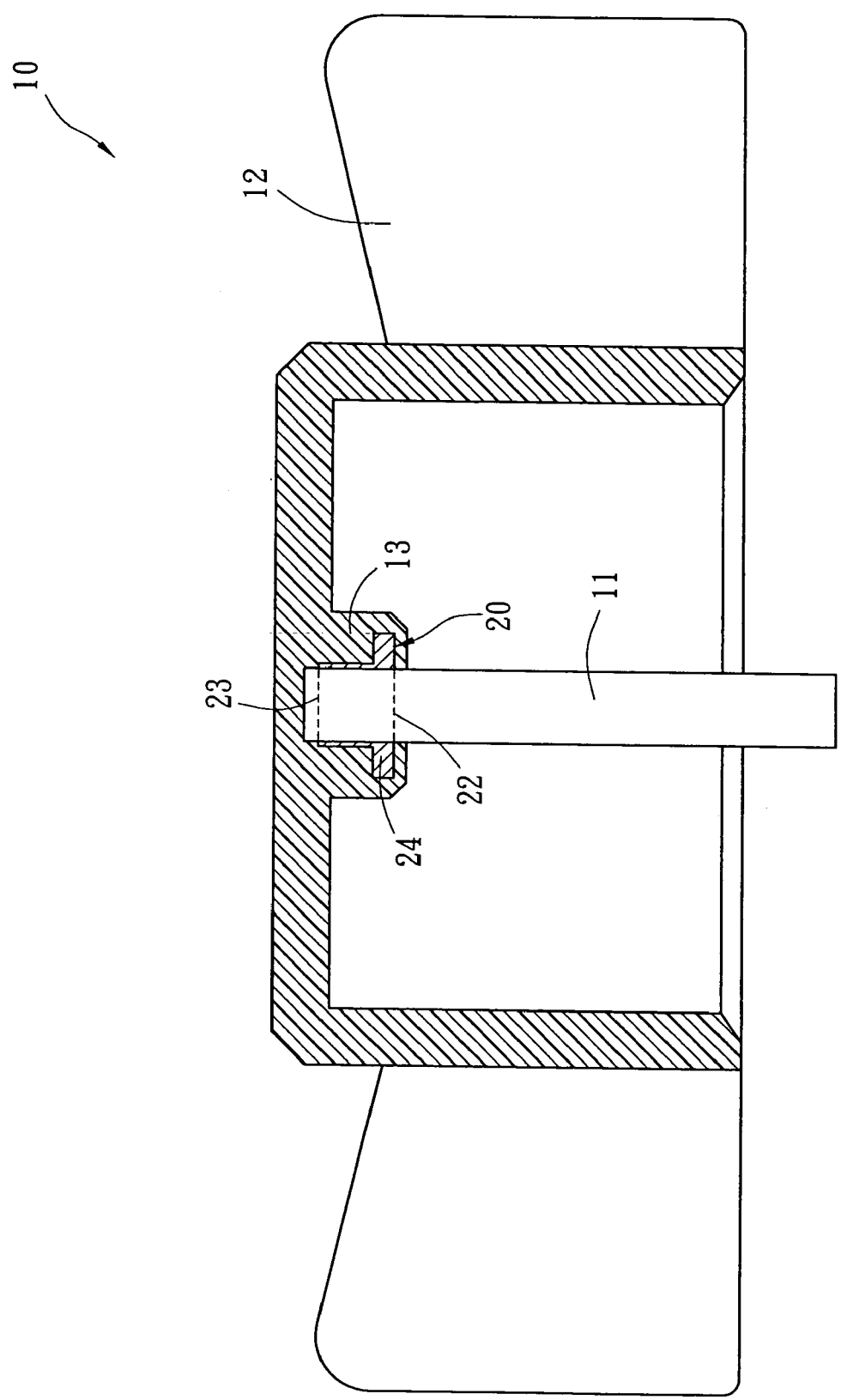
FIG. 3 is a sectional view of the present invention.

Please refer to FIGS. 1, 2 and 3, according to the invention an air fan 10 includes a ceramic spindle 11 and vanes 12. In order to increase the speed and airflow volume of the air fan 10, the ceramic spindle 11 is made from material that is hard and rigid, and can withstand wearing and high temperature. The ceramic spindle 11 generally has a hard and smooth surface. Hence a metal bushing 20 is provided as the fastening medium to couple the ceramic spindle 11 with the vanes 12.

Referring to FIGS. 1 and 2, the metal bushing 20 has a housing space 21 in the interior. The housing space 21 has an inlet 22 and a fastening section 23. The housing space 21 is tapered at the fastening section 23 from the inlet 22 so that the ceramic spindle 11 may be inserted from the inlet 22 and squeezed and held tightly at the fastening section 23 to form a secured coupling. The metal bushing 20 further has a coupling section 24 at one end corresponding to the inlet 22. The coupling section 24 may be engaged with bores 14 formed on a connecting section 13 of the vanes 12. Then the connecting section 13 and the coupling section 24 are filled and embedded together during injection forming to form a tight coupling. The ceramic spindle 11 rotates causing the coupling section 24 to drive the vanes 12 through the connecting section 13 without generating relative rotation therebetween. Thereby the ceramic spindle 11 may be coupled with the vanes 12 through the metal bushing 20.

Referring to FIGS. 2 and 3, for assembly, insert the ceramic spindle 11 into the housing space 21 of the metal bushing 20 through the inlet 22 until reaching the tapered fastening section 23 to be squeezed and coupled tightly. As the metal bushing 20 has a thin wall, it will be slightly expanded by the inserting ceramic spindle 11 to form a tight coupling without cracking.

While the preferred embodiment of the invention has been set forth for the purpose of disclosure, modifications of the disclosed embodiment of the invention as well as other embodiments thereof may occur to those skilled in the art. Accordingly, the appended claims are tended to cover all embodiments which do not depart from the spirit and scope of the invention.

What is claimed is:
1. A spindle coupling structure, comprising:
a ceramic spindle;
a metal bushing having a housing space receiving one end of said spindle at an inlet, said housing space having a fixed taper extending inwardly from the inlet so that an inner diameter inside the housing space is smaller than a diameter of the inlet;

a hub having a connecting section directly for receiving said metal bushing so that said spindle is located inside said metal bushing and said metal bushing is located inside said hub and said ceramic spindle is operably connected to said hub through said metal bushing;

said ceramic spindle being mounted in said housing space by being inserted through said inlet so as to be held tight to said metal bushing by forcing an outer diameter of said ceramic spindle directly against the inner diameter of said housing space due to the taper in said housing space to that an outer surface of said metal bushing frictionally engages said connecting section of the hub.

2. The coupling structure of claim 1, wherein the metal bushing has a coupling section.

3. The coupling structure according to claim 2, wherein the connecting section of said hub and the coupling section of said metal bushing are embedded together during injection to form a tight coupling.

4. The coupling structure according to claim 1, wherein the metal bushing has a thin wall which will be slightly expanded by the insertion of the ceramic spindle into the housing space.

5. The coupling structure according to claim 1, wherein the ceramic spindle has a hard and smooth surface.

6. The coupling structure according to claim 1, wherein the hub supports blades to form a fan.

7. The coupling structure according to claim 1, wherein the ceramic spindle is inserted into said housing space at said inlet so as to be squeezed and held tightly by a fastening section of said housing space to form a secure coupling.

8. The coupling structure according to claim 1, wherein said ceramic spindle is in direct contact with said metal bushing.

9. The coupling structure according to claim 1, wherein an outer diameter of said ceramic spindle is smaller than a diameter of said inlet and larger than the diameter of said housing space at an end opposite said inlet.

* * * * *